No. 816,093. PATENTED MAR. 27, 1906.
J. HOPKINSON.
COMPUTING SCALE.
APPLICATION FILED DEC. 4, 1905.

Witnesses
Inventor
Joseph Hopkinson
By Staley & Bowman
Attorneys

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

No. 816,093.     Specification of Letters Patent.     Patented March 27, 1906.

Application filed December 4, 1905. Serial No. 290,070.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to improvements in computing-scales, and particularly to that class of computing-scales which employ a tabulated table or chart and an indicating-hand adapted to be moved to different positions over said table by the load.

The object of my invention is to improve the construction of the indicating-hand so that the amounts on the table or chart indicated thereby may be more easily and accurately read.

My invention consists in the construction hereinafter described, and pointed out in the claims.

Figure 1:
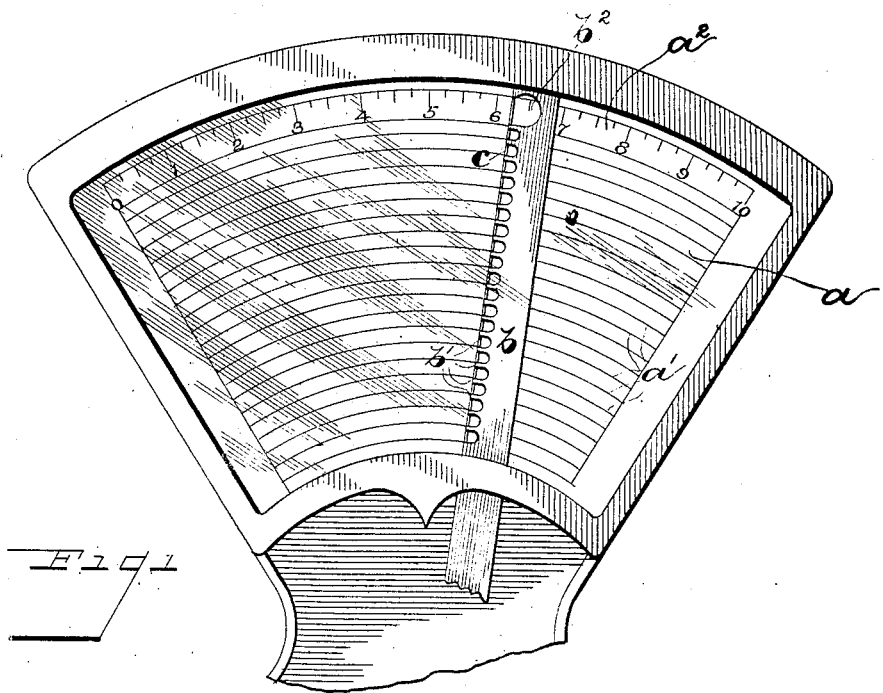
Figure 2:
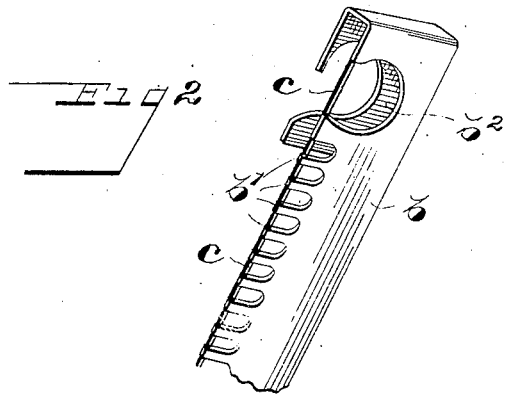

In the accompanying drawings, Figure 1 is a side view of a table or chart and its index-hand embodying my invention. Fig. 2 is a detail of the hand.

Like parts are represented by similar letters of reference in both the views.

In scales of this character the chart or table is provided with a series of rows of price-totals, and the index-hand is provided with a row of price-per-pound indications, one for each row of price-totals on the chart. It has been common to provide on one edge of the index-hand a series of fingers or pointers, one for each price-per-pound indication, to point out or indicate the proper price-total on the chart, which requires a close scrutiny on the part of the operator to ascertain the correct amount of the indication. To obviate this difficulty and make the reading of the indications more simple, I have constructed the indicating edge of the hand in the manner hereinafter described.

In the said drawings, $a$ represents the tabulated chart.

$a'$ represents the series of price-totals, the tabulated numerals thereon not being shown, however.

The top of the chart is provided with weight-indications, as shown at $a^2$.

$b$ is the index-hand, so arranged as to be moved over the tabulated chart by the load in a manner well known in the art.

$b'$ represents the fingers or pointers arranged along one edge of the hand, opposite to which are placed the price-per-pound numerals, (not shown,) there being one of these pointers and price-per-pound indications for each row of price-totals on the chart. That part of the hand opposite the weight-indications is cut away, as shown at $b^2$.

Extending along the outer ends of the fingers or pointers $b'$ is a fine wire or strip of metal $c$, this wire or strip being secured thereto by soldering or otherwise. The wire or strip is also extended up across the cut-away portion $b^2$ and secured in like manner to the upper end of the hand. The adjustment is such that this fine wire or strip will be brought opposite the proper point on the tabulated chart to indicate the proper price-total and will enable the operator to more readily and accurately read the indication.

Having thus described my invention, I claim—

1. In a computing-scale, a tabulated chart having a series of rows of price-total indications and an index-hand arranged to move over said chart having a series of price-per-pound indications to coöperate with the indications on said chart, a series of pointers along one edge of said index-hand, one for each row of price-total indications, a cut-away portion at the top of said hand and a row of indications on said chart adjacent to said cut-away portion, and a thin strip of material extending across the cut-away portion, substantially as and for the purpose specified.

2. In a computing-scale, a tabulated chart having a series of rows of price-total indications, an index-hand arranged to be moved over said chart and having a series of price-per-pound indications to coöperate with the price-total indications on said chart, a series of pointers along one edge of said index-hand, and a thin strip of material extending over the series of pointers, substantially as and for the purpose specified.

3. In a computing-scale, a tabulated chart having a series of indications, an index-hand also having a series of indications to coöperate with the indications on said chart and adapted to be moved over said chart, said index-hand being cut away at intervals to correspond to the indications thereon, and a strip of material extending along the index-hand and across the series of cut-away portions, substantially as and for the purpose specified.

In testimony whereof I have hereunto set my hand this 25th day of November, A. D. 1905.

JOSEPH HOPKINSON.

Witnesses:
S. L. McKee,
D. A. De Vanney.